United States Patent [19]
Fritz et al.

[11] Patent Number: 5,106,245
[45] Date of Patent: Apr. 21, 1992

[54] WHEEL CHOCKS FOR USE ON VEHICLE TRANSPORT CARRIERS

[75] Inventors: William E. Fritz, Naperville; James C. Pankow, Geneva, both of Ill.

[73] Assignees: Donald L. Moyer, Omaha, Nebr.; Thomas O. Allred, Mount Pleasant, Utah

[21] Appl. No.: 274,362

[22] Filed: Nov. 21, 1988

[51] Int. Cl.$^5$ .......................... B61D 3/18; B60P 3/06
[52] U.S. Cl. .................................. 410/9; 410/20; 410/30
[58] Field of Search .................. 410/9, 10, 12, 19, 20, 410/30

[56] References Cited

U.S. PATENT DOCUMENTS

| | | | |
|---|---|---|---|
| 4,659,266 | 4/1987 | Thelen et al. | 410/10 |
| 4,786,223 | 11/1988 | Crissy et al. | 410/20 |
| 4,838,743 | 6/1989 | Blunden et al. | 410/9 |

Primary Examiner—Robert J. Oberleitner
Attorney, Agent, or Firm—John A. Beehner

[57] ABSTRACT

A chock for use in securing four wheel vehicles such as automobiles to the deck-mounted rail of a transport carrier includes a frame, with the frame having a pocket formed and adapted to mount the frame laterally over the deck-mounted rail. The rail has a series of transverse openings and the frame has at least one pin extending from the side of the pocket and positioned to extend through a rail opening. There is a locking member pivotally mounted to the frame on an axis perpendicular to the frame pin or pins. The locking member has a handle portion outside of the frame and a rail engaging portion movable within the pocket and arranged to bear against one side of the rail to secure the frame pin or pins within the rail openings and thus the frame to the rail. There is a latch for holding the locking member in a locking position. A rotatable rod is mounted in the frame and has a tire engaging web attached to it with rotation of the rod tightening or releasing the web.

21 Claims, 3 Drawing Sheets

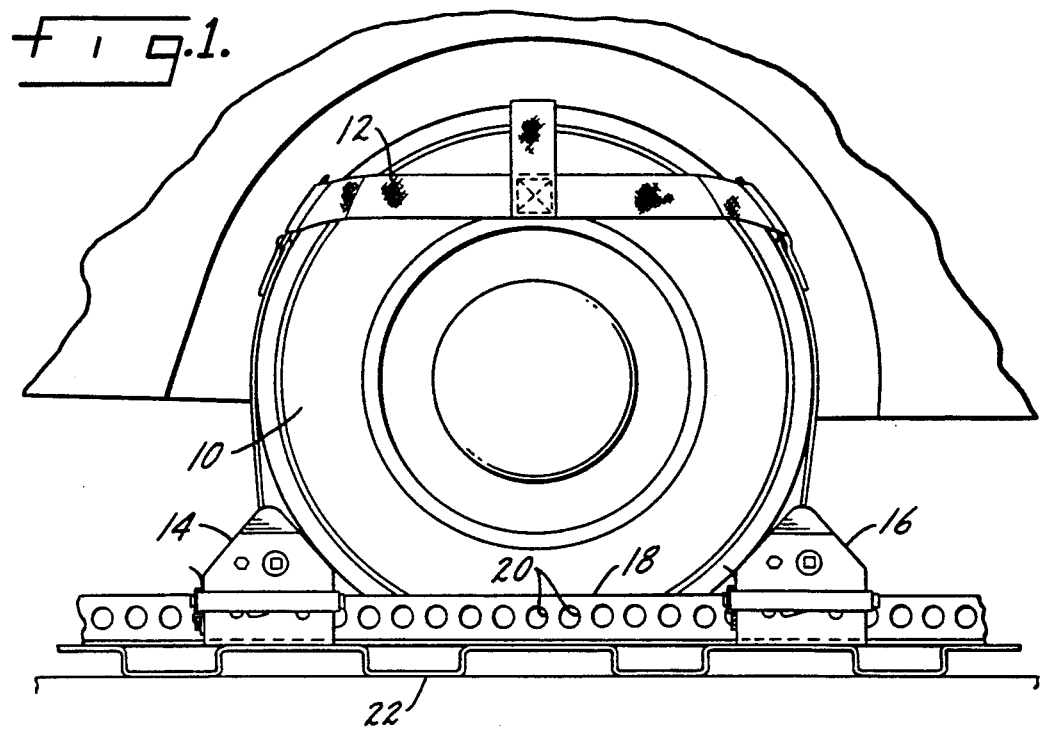
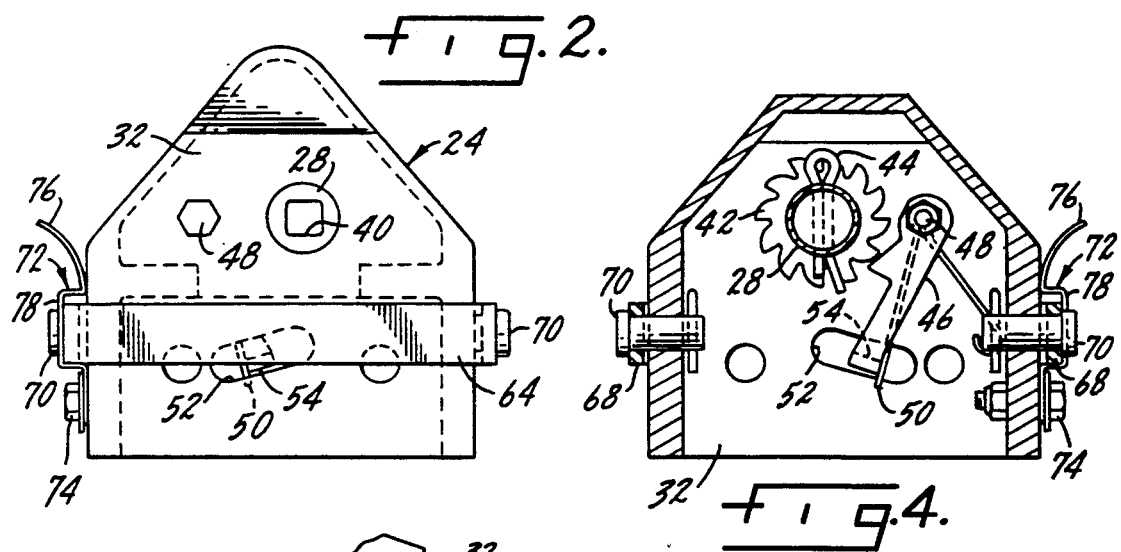
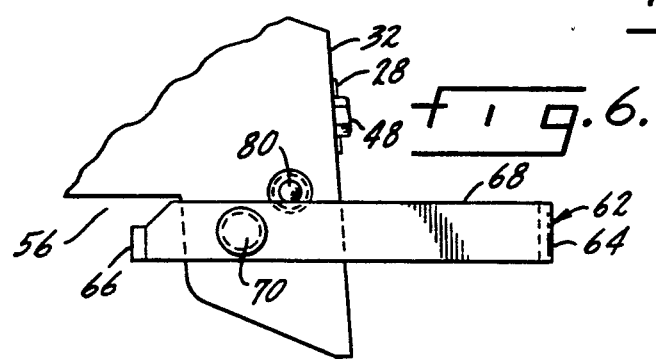

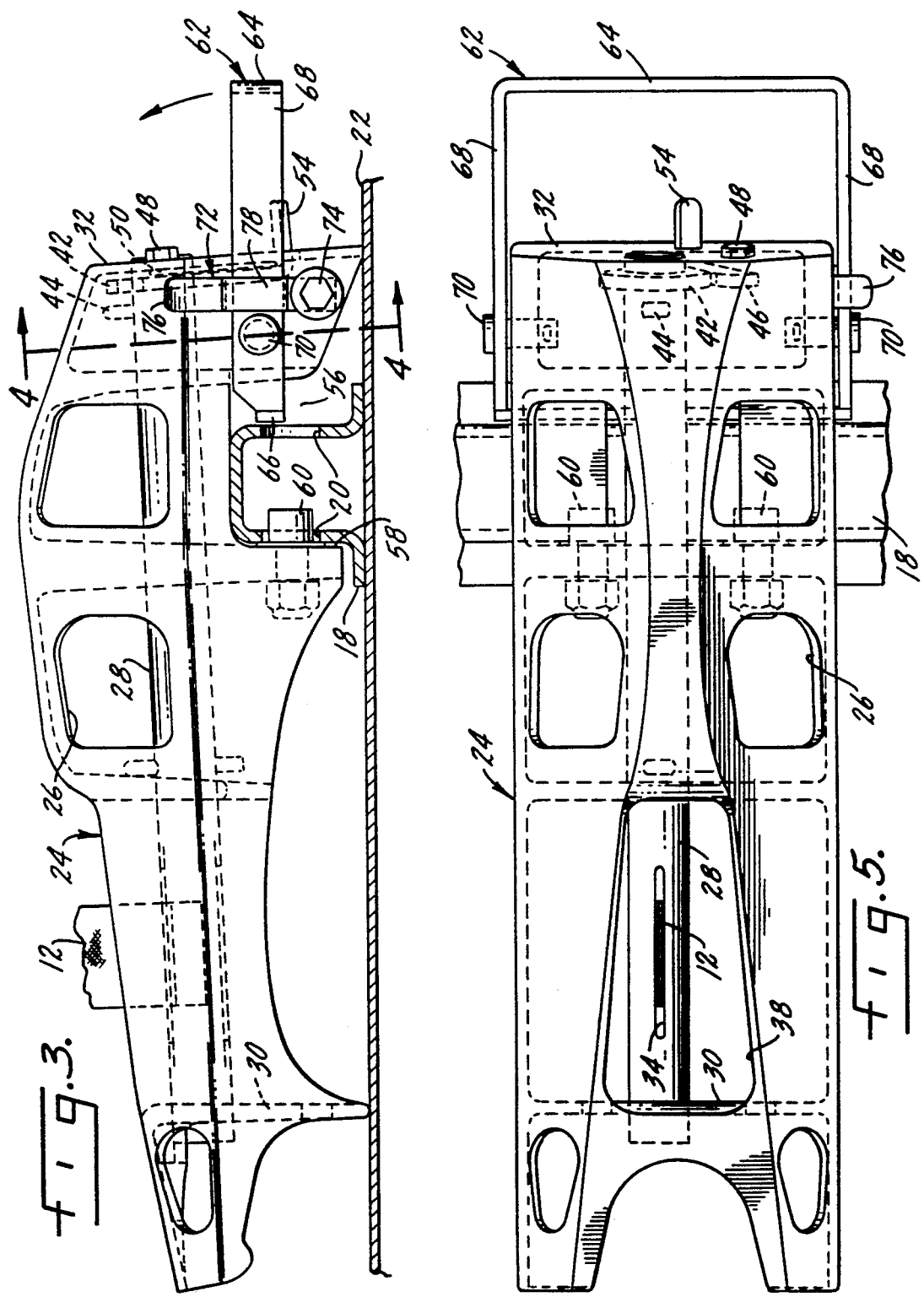

WHEEL CHOCKS FOR USE ON VEHICLE TRANSPORT CARRIERS

SUMMARY OF THE INVENTION

The present invention relates to chocks used to wedge or lock the wheels of four wheel vehicles such as automobiles onto the deck of a transportation vehicle such as a railroad car or over-the-road trailer. The invention is particularly concerned with such a chock which is reliably operable and has all of the operating elements easily accessible for loading and unloading personnel.

A primary purpose of the invention is a chock of the type described having a frame and a locking member pivoted to the frame, with the position of the locking member being readily visible to loading and unloading personnel.

Another purpose is a chock for the use described in which the ratchet assembly used to tighten and release the wheel engaging web is located within the frame to protect it from the harsh environment normally associated with transportation vehicles.

Another purpose is a chock of the type described which utilizes a pair of pins to positively secure the chock to the transportation vehicle deck-mounted rail.

Another purpose is a chock in which all of the movable parts used in securing and releasing the vehicle are away from the vehicle tire and easily accessible to loading and unloading personnel.

Other purposes will appear in the ensuing specification. drawings and claims.

BRIEF DESCRIPTION OF THE DRAWINGS

The invention is illustrated diagrammatically in the following drawings wherein:

FIG. 1 is a side view illustrating a vehicle tire mounted to the deck of a transportation vehicle using the chocks disclosed herein, FIG. 2 is an enlarged front view of the chock, FIG. 3 is a side view of the chock, FIG. 4 is a section taken on line 4—4 of FIG. 3, showing the inside of the front of the chock, FIG. 5 is a top view of the chock, FIG. 6 is a partial side view of the chock, illustrating an alternate embodiment of the invention.

DESCRIPTION OF THE PREFERRED EMBODIMENT

Figure 7:
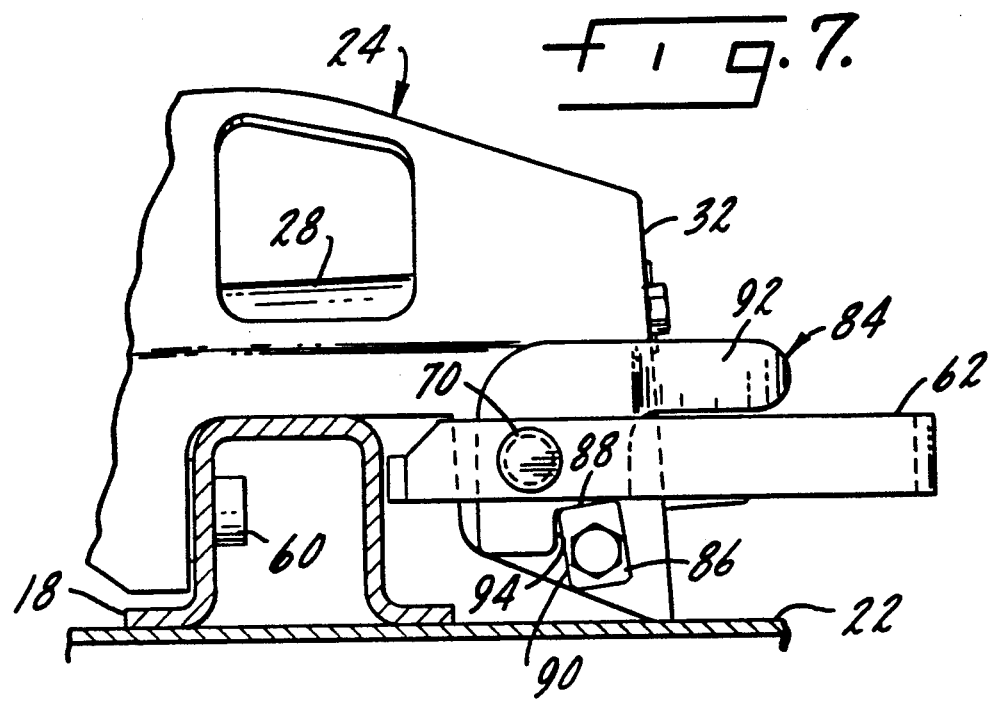
FIG. 7 is a partial side view showing a further embodiment of the invention.

Automotive vehicles are commonly transported on rail cars or on over-the-road trailers. In either case, it had been the practice to chain the body of the vehicle to the carrier. This arrangement caused stresses from the transport vehicle to be applied directly to the body of the automobile and was also cumbersome and difficult for personnel who were loading and unloading the vehicle. Recently, Thrall Car Manufacturing Company has devised a chock block which is used to chock or wedge the wheels of an automobile to the deck of a transport carrier. For example, such a device is shown in U.S. Pat. No. 4,668,140. More recent chocks have overcome some of the problems associated with the design in the '140 patent, but still have not provided a means for positively securing the vehicle wheels to the transport carrier in a manner which assures that the vehicle will not move and which readily indicates to loading personnel that in fact the chock is locked to the deck of the transport vehicle. The present invention is specifically directed to overcome the deficiencies of currently-used chocks of the type described.

In FIG. 1, the wheel of a vehicle such as an automobile is indicated at 10 and is secured by webbing 12 to a left-hand chock 14 and a right-hand chock 16. The chocks 14 and 16 may be identical in construction and one of the advantages of the present invention is that the chocks are universal. They may be used on either side of a wheel. Chocks 14 and 16 are mounted to a rail 18 having spaced openings 20 with the rail being attached to the deck 22 which may represent the deck of either a railroad car or an over-the-road trailer.

The chock includes a frame indicated generally at 24, with the frame preferably being a one-piece construction having a plurality of openings, such as that indicated at 26, which lighten the frame. A rod 28 is journaled in the frame back 30 and in the frame front wall 32. Rod 28 has an opening 34, illustrated in FIG. 5, which is used to attach the web 12 to the frame. The web is normally formed in two sections, one having that portion which fits over the tire, as illustrated in FIG. 1, and the other having a hook which attaches to the first web section. The webbing or web may be drawn up tight on the tire by turning the rod 28 of either chock. Note particularly in FIG. 5 that the axis of rod 28 is slightly offset from the centerline of the frame, which permits the web to be payed out from frame opening 38 without catching on the frame.

As shown in FIG. 2, front wall 32 of the frame, which supports the front of rod 28, has a tool receiving opening 40 so that car loading personnel may turn rod 28 to tighten the webbing. FIG. 4 shows the inside of frame front wall 32. Rod 28 mounts a ratchet 42 attached to the rod by a cotter pin 44. A pawl 46 is pivotally mounted, as at 48, to front wall 32 and is urged by a spring 50 into engagement with the ratchet. Frame front wall 32 has an elongated opening 52 through which extends a release lever 54 integrally formed with the pawl. Release lever 54 will permit the pawl to be moved away from the ratchet, so as to release the webbing when unloading the vehicle.

Rail 18 is illustrated in detail in FIG. 3 and is generally U-shaped in cross section. Each of the sides of the rail have aligned openings 20. A pocket 56 is formed in the bottom of the frame with the pocket having a rear wall 58 which mounts a pair of pins 60 which, when the chock is mounted on the rail, will extend through a pair of openings 20 in the rail.

The locking member is indicated generally at 62 and has an exterior handle 64 and a rail engaging portion 66 which is movable within pocket 56. Locking member 62 has sides 68, each of which joins the handle and the rail engaging portion and each of which is pivotally mounted, by pins 70, to the sides of the frame directly adjacent frame front wall 32.

As particularly shown in FIG. 3, when the chock is positioned on a rail and the pins 60 extend through openings 20 in the rail, and locking member 62 is in the locked position of FIG. 3, the gap between rail engaging portion 66 and frame pocket wall 58 is only slightly larger than the width of the rail. Thus, the chock is positively secured to the rail when the locking member is in the locked position of FIG. 3.

A latch for holding locking member 62 in the locked position of FIG. 3 in the embodiment shown in FIGS. 2-5 is a flexible strap 72 pinned to one frame wall, as at 74. Strap 72 has a handle portion 76 for engagement by loading and unloading personnel and has a locking portion 78, particularly shown in FIG. 2, which is of a size and shape to fit over the side 68 of locking member 62 and thus hold the locking member in the locked or down position. The curved portion 76, which is used to release the lever, also functions to hold locking element 62 out of a locked position after it has been released. Thus, loading personnel do not have to release strap or lever 72 in order to position the chock on the rail.

FIG. 6 shows an alternate embodiment in which the flexible lever 72 of FIGS. 2-5 has been replaced by a spring-biased pin 80. The pin normally engages the upper surface of side portion 68 of locking member 62 when the locking member is in the locked position shown. After the locking member has been released, the lower surface of side portion 68 will rest on top of the pin, again so that loading personnel do not have to release the locking element before placing the chock on the rail.

Figure 8:
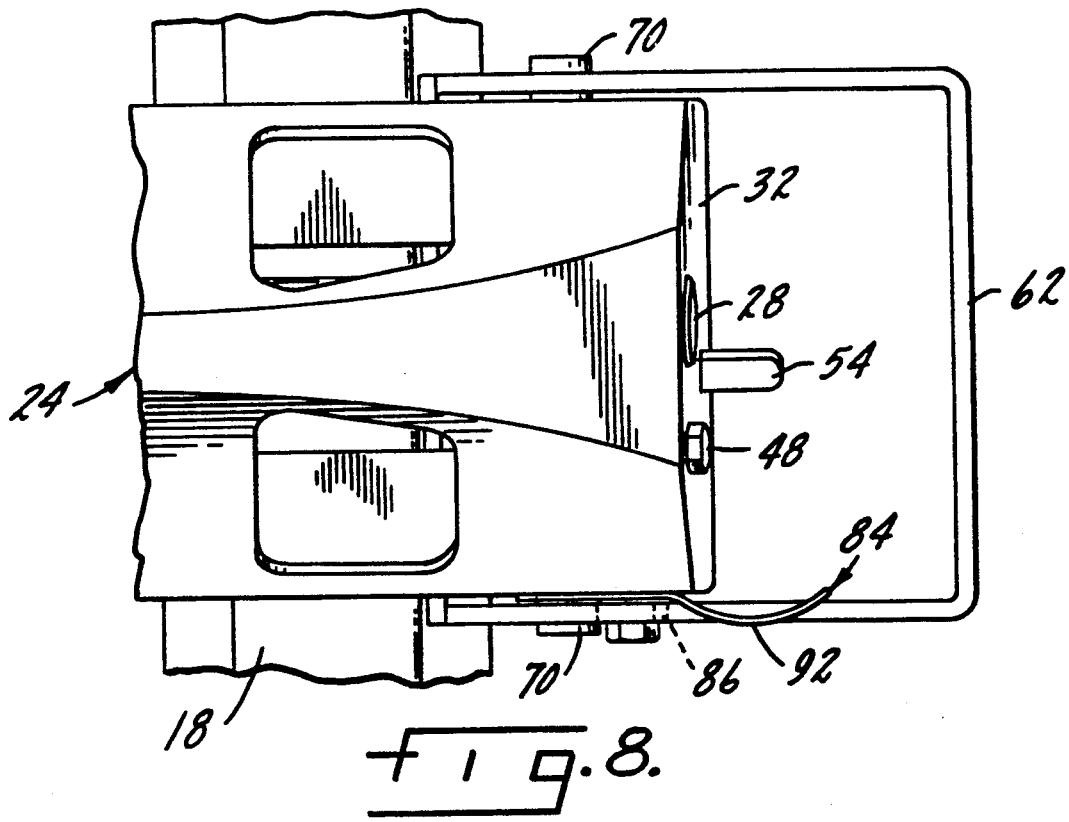
FIG. 8 is a partial top view of the chock of FIG. 7.

FIGS. 7 and 8 show a further modification of the invention, particularly a different form of latch or lever to hold locking member 62 in a locked position. A flexible latch 84 is attached to the wall of the frame by one of the pivot pins 70. A stop 86 is mounted to the frame wall below and forward of pin 70 and limits both downward or locking motion of locking member 62 and movement toward the up or release direction of the locking member. Note particularly in FIG. 7 that the top surface 88 of stop 86 prevents further clockwise movement of the locking member and side surface 90 of stop 86 will limit counterclockwise movement of locking member 62.

Flexible lever 84 has a release portion, shown particularly in FIG. 8, indicated at 92 and its arcuate extension overlies the top of locking member 62, thus holding the locking member in the locked position of FIGS. 7 and 8. To release lever 84, it is only necessary to pull the curved portion 92 inward so that it does not overlie the locking member which is then free to be moved in a counterclockwise direction to a full release position. Since lever 84 is made of a spring steel, once released it will flex back to its unstressed position of FIGS. 7 and 8.

Stop 90, in addition to limiting movement of locking member 62, fits within a notch portion 94 of lever 84 and thus prevents any movement of the latch during movement of the locking member.

Of particular advantage is the mean for positively locking the chock onto a rail. Once the pins are positioned within openings in the rail, locking element 62 is moved to the locked position of FIG. 3 and the chock is positively secured. It cannot be released unless locking member 62 is in fact moved to a release position after first releasing lever 72, pin 80 or lever 84. The use of two pins to hold the chock is important. Prior constructions used only a single pin and even those with double pins did not utilize a locking element which is easily accessible from the front of the chock. Since the chock faces outwardly from the transport vehicle, as indicated in FIG. 1, it is easy for loading personnel to determine if the chock is in fact locked in position, as the position of locking member 62 readily discloses the condition of the chock on the rail.

Also of importance is the placement of the ratchet and pawl construction controlling operation of web rod 28 inside of the chock, rather than on the exterior. In this way, the ratchet mechanism is protected from environmental hazards normally associated with railroad cars and over-the-road trailers.

Whereas the preferred form of the invention has been shown and described herein, it should be realized that there may be many modifications, substitutions and alterations thereto.

The embodiments of the invention in which an exclusive property or privilege is claimed are defined as follows:

1. A chock for use in securing four wheel vehicles to the deck-mounted rail of a transport carrier including,
 a frame, said frame having a pocket formed and adapted to mount the frame laterally over a deck-mounted rail having a series of transverse openings therein, at least one pin extending from one side of the frame pocket and positioned to extend through a rail opening,
 a locking member pivotally mounted to said frame on an axis perpendicular to said at least one pin and having a handle portion thereof outside of said frame, said locking member having a rail engaging portion movable within said pocket and arranged to bear against one side of the rail to secure said at least one pin within the rail openings and thus the frame to the rail, a latch for holding said locking member in a position locking the frame to the rail, and
 a tire engaging web associated with said frame, and means for tightening and releasing the tire engaging web.

2. The chock of claim 1 further characterized in that said handle has four sides, the handle portion which is on the outside of the frame, the rail engaging portion which is movable within the pocket, and two side portions which join the rail engaging portion and the handle portion, said side portions being pivotally mounted to the exterior of the frame.

3. The chock of claim 2 further characterized in that said locking member latch is mounted on the frame and in engagement with one of said side portions.

4. The chock of claim 3 further characterized in that said latch is a flexible release lever attached to the exterior of said frame, said release lever holding said locking member in a down and locked position when engaged with said locking member.

5. The chock of claim 4 further characterized in that said flexible release lever has an arcuate portion overlying said locking member.

6. The chock of claim 4 further characterized in that said flexible release lever has a portion formed and adapted to contact three sides of one of said handle sides.

7. The chock of claim 3 further characterized in that said latch includes a spring-biased pin mounted in the frame to be in engagement with an upper surface of said locking member side portion when the locking member is in a down and locked position.

8. The chock of claim 1 further characterized in that the means for tightening and releasing the tire engaging web include a rotatable rod mounted in said frame, said rotatable rod extending transversely of the rail and having a tool receiving opening adjacent the frame, accessible from the frame exterior adjacent the handle portion of the locking member.

9. The chock of claim 8 further characterized by and including a ratchet member attached to said rod, inside of the frame, a pawl pivoted to said frame and in engagement with the ratchet member, and a release lever for said pawl extending outwardly through the frame.

10. The chock of claim 9, further characterized in that said frame has a front wall, with said tool receiving opening being accessible at said front wall, and with said pawl releasing lever extending through said front wall.

11. The chock of claim 10 further characterized by including a spring on the inside of the frame, attached to the interior of the front wall, and biasing said pawl into engagement with said ratchet.

12. The chock of claim 8 further characterized in that said frame has a centerline, the axis of said rod being offset from said frame centerline, with the tire engaging web extending from around the rod, within the frame, outwardly from the frame.

13. A chock for use in securing four wheel vehicles to the deck-mounted rail of a transport carrier including,
   a frame, said frame having a pocket formed and adapted to mount the frame laterally over a deck-mounted rail having a series of transverse openings therein, at least one pin extending from one side of the frame pocket and positioned to extend through a rail opening,
   a locking member pivotally mounted to said frame on an axis perpendicular to said at least one pin and having a handle portion thereof outside of said frame, said locking member having a rail engaging portion movable within said pocket and arranged to bear against one side of the rail to secure said at least one pin within the rail openings and thus the frame to the rail, and a latch for holding said locking member in position locking the frame to the rail.

14. A wheel chock for use on a motor vehicle transporter for releasable attachment to an elongated restraining element affixed to the transporter and having a pair of upright walls, at least one of which contains a longitudinal series of uniformly spaced and sized holes, the chock comprising
   a. an elongated body formed with a transverse, open bottom recess for receiving the restraining element and being bounded at one side by a transverse wall;
   b. a pair of locking pins carried by the body, projecting into the recess from the transverse wall, and being arranged to engage in alternate holes in the restraining element;
   c. a transverse latching member mounted for pivotal movement on the body at the side of the recess opposite the transverse wall so it may be swung into and out of the recess when the body is on the restraining element and the pins are engaged in holes in that element;
   d. the latching member having a latching position, in which it is disposed in the recess along one of the upright walls of the restraining element and coacts with the transverse body wall to limit movement of the body in its longitudinal direction and prevent withdrawal of the pins from their associated holes; and
   e. a manually releasable locking means for selectively holding the latching member in latching position.

15. A chock for use in securing four wheel vehicles to the deck-mounted rail of a transport carrier including,
   a frame, said frame having a pocket formed and adapted to mount the frame laterally over a deck-mounted rail having a series of transverse openings therein, a pair of pins extending from one side of the frame pocket and positioned to extend through respective rail openings,
   a locking member pivotally mounted to said frame on an axis perpendicular to the frame pins and having a handle portion thereof outside of said frame, said locking member having a rail engaging portion movable within said pocket and arranged to bear against one side of the rail to secure the frame pins within the rail openings and thus the frame to the rail, the space between the side of the frame pocket mounting the pins and the rail engaging portion of the locking member, when the locking member is in a down and locked position, being only slightly greater than the width of a rail, a latch for holding said locking member in a position locking the frame to the rail, and
   a tire engaging web associated with said frame, and means for tightening or releasing the tire engaging web.

16. The chock of claim 15 further characterized in that said handle has four sides, the handle portion which is on the outside of the frame, the rail engaging portion which is movable within the pocket, and two side portions which join the rail engaging portion and the handle portion, said side portions being pivotally mounted to the exterior of the frame.

17. The chock of claim 16 further characterized in that said latch is mounted on the frame and in engagement with one of said side portions.

18. The chock of claim 17 further characterized in that said latch is a flexible release lever attached to the exterior of said frame, said release lever holding said locking member in a down and locked position when engaged with said locking member.

19. The chock of claim 18 further characterized in that said flexible release lever has an arcuate portion overlying said locking member.

20. The chock of claim 18 further characterized in that said flexible release lever has a portion formed and adapted to contact three sides of one of said handle sides.

21. A wheel chock for use on a motor vehicle transporter for releasable attachment to an elongated restraining element affixed to the transporter and having a pair of upright walls at least one of which contains a longitudinal series of uniformly spaced and sized holes, the chock comprising,
   a. an elongated body formed with a transverse, open bottom recess for receiving the restraining element and being bounded at one side by a transverse wall;
   b. a pair of locking pins carried by the body, projecting into the recess from the transverse wall, and being arranged to engage in alternate holes in the restraining element;
   c. a transverse latching member mounted for pivotal movement on the body at the side of the recess opposite the transverse wall so it may be swung into and out of the recess when the body is on the restraining element and the pins are engaged in holes in that element;
   d. the latching member having a latching position in which it is disposed in the recess along one of the upright walls of the restraining element and coacts with the transverse body wall to limit movement of the body in its longitudinal direction and prevent withdrawal of the pins from their associated holes; and
   e. a manually releasable locking means for selectively holding the latching member in latching position.

* * * * *